(12) United States Patent
Brauner et al.

(10) Patent No.: US 11,084,393 B2
(45) Date of Patent: Aug. 10, 2021

(54) VEHICLE MICROGRID PLUG AND PLAY POWER OUTLET PANEL

(71) Applicant: FORD GLOBAL TECHNOLOGIES, LLC, Dearborn, MI (US)

(72) Inventors: Jacek Brauner, Plymouth, MI (US); Theodore Joseph Filippi, Brownstown, MI (US); Allan Roy Gale, Livonia, MI (US); Ke Zou, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 345 days.

(21) Appl. No.: 16/106,405

(22) Filed: Aug. 21, 2018

(65) Prior Publication Data

US 2020/0062125 A1 Feb. 27, 2020

(51) Int. Cl.

| | |
|---|---|
| *B60L 55/00* | (2019.01) |
| *B60L 1/00* | (2006.01) |
| *H02J 3/02* | (2006.01) |
| *H02J 3/32* | (2006.01) |
| *H02J 7/34* | (2006.01) |
| *H02J 3/38* | (2006.01) |
| *B60L 53/16* | (2019.01) |

(52) U.S. Cl.
CPC .............. *B60L 55/00* (2019.02); *B60L 1/006* (2013.01); *B60L 53/16* (2019.02); *H02J 3/02* (2013.01); *H02J 3/32* (2013.01); *H02J 3/38* (2013.01); *H02J 7/34* (2013.01); *B60L 2240/72* (2013.01); *H02J 2207/20* (2020.01); *H02J 2300/30* (2020.01)

(58) Field of Classification Search
CPC .......... B60L 55/00; B60L 53/16; B60L 1/006; B60L 2240/72; H02J 2207/20; H02J 3/02; H02J 3/32; H02J 7/34; H02J 3/38; H02J 2300/30; H02J 7/0063; H02J 2310/48; H02J 2310/14; Y04S 10/126; Y02T 10/7072; Y02T 90/14; Y02T 10/70; Y02T 90/16; Y02T 10/72; B60R 16/02; H02M 2001/009; H02M 7/42
See application file for complete search history.

(56) References Cited

U.S. PATENT DOCUMENTS

| | | | | |
|---|---|---|---|---|
| 5,086,266 | A * | 2/1992 | Shiga | H02J 7/1438 322/28 |
| 8,215,070 | B2 * | 7/2012 | Railkar | H02S 20/25 52/173.3 |
| 8,267,726 | B1 * | 9/2012 | Love, II | H04Q 1/09 439/668 |
| 9,172,245 | B1 * | 10/2015 | Lentine | H02J 3/00 |
| 9,511,676 | B2 * | 12/2016 | Loftus | B60L 53/16 |
| 9,610,844 | B2 * | 4/2017 | Cho | B60L 3/0046 |
| 9,965,007 | B2 * | 5/2018 | Amelio | G06F 1/1632 |
| 10,153,707 | B2 * | 12/2018 | Dilley | H02M 7/003 |
| 10,389,540 | B2 * | 8/2019 | Buchanan | H04L 12/10 |
| 2007/0184721 | A1 * | 8/2007 | Ewing | H02B 1/20 439/620.26 |

(Continued)

*Primary Examiner* — Kyle J Moody
(74) *Attorney, Agent, or Firm* — David B. Kelley; Brooks Kushman P.C.

(57) ABSTRACT

A vehicle system includes a controller programmed to receive power outlet data from an interchangeable outlet panel via a communication channel and operate an inverter to supply power to the interchangeable outlet panel via a power interface according the power outlet data.

17 Claims, 4 Drawing Sheets

(56) References Cited

U.S. PATENT DOCUMENTS

| | | | |
|---|---|---|---|
| 2010/0109430 A1* | 5/2010 | DiSaverio | B60R 16/03 307/10.1 |
| 2013/0215581 A1* | 8/2013 | Utz | H05K 1/181 361/752 |
| 2015/0022001 A1* | 1/2015 | Goei | H02J 7/0068 307/65 |
| 2016/0141879 A1 | 5/2016 | Motsenbocker | |
| 2019/0214932 A1* | 7/2019 | Barrass | B60L 3/12 |
| 2020/0055473 A1* | 2/2020 | Ferrel | B60L 3/12 |
| 2020/0076217 A1* | 3/2020 | Filippi | B60L 53/22 |
| 2020/0114765 A1* | 4/2020 | Brauner | B60L 53/16 |
| 2020/0122580 A1* | 4/2020 | Zou | B60L 53/20 |
| 2020/0122585 A1* | 4/2020 | Bhat | G05B 19/042 |
| 2020/0191345 A1* | 6/2020 | Chien | F21V 5/04 |
| 2020/0290461 A1* | 9/2020 | Lu | B60L 3/04 |

\* cited by examiner

VEHICLE MICROGRID PLUG AND PLAY POWER OUTLET PANEL

TECHNICAL FIELD

This application generally relates to a system for operating a vehicle power system with interchangeable outlet panels.

BACKGROUND

Electrified vehicles include electrical power sources such as a battery and a generator. The electrical power sources are used for propulsion and providing power to on-board systems. The power provided to the on-board systems is predefined and generally not extendible to off-board devices. Electrified vehicles may include limited power provision to external devices. For example, the vehicle may provide one or more 12-Volt outlets for providing power to external devices. However, these predefined power outlets provide little flexibility regarding devices that can receive power from the vehicle. Only devices that are compatible with the 12-Volt power output can be plugged in. Many power configurations for external devices are unsupported by typical vehicles.

SUMMARY

A vehicle includes an inverter and a housing configured to interchangeably couple outlet panels, each defining power specifications including target voltages and target frequencies, to the inverter. The vehicle further includes a controller programmed to, responsive to replacing a first outlet panel with a second outlet panel, change voltage and frequency outputs of the inverter to the target voltages and target frequencies received from the second outlet panel.

The controller may be further programmed to output a reset signal to the outlet panels for resetting a circuit breaker in outlet panels configured with the circuit breaker. The controller may be further programmed to receive a status of a ground fault interrupter circuit from the outlet panels. The outlet panels may receive multiple power inputs and the power specification may define corresponding target voltages and target frequencies for each of the multiple power inputs, and the controller may be further programmed to operate the inverter such that separate outputs of the inverter are used to supply the multiple power inputs with the corresponding target voltages and target frequencies. At least two of the target voltages may be of different magnitudes. The power specification may define a target direct current (DC) voltage magnitude and the controller may be programmed to operate the inverter to supply power with the target DC voltage magnitude. The power specifications may further define a current limit value and the controller may be further programmed to operate the inverter such that a current provided by the inverter does not exceed the current limit value. The controller may be further programmed to, responsive to the power specifications defining parameters that cannot be satisfied by the inverter, output a status to the outlet panels for display. The controller may be further programmed to, responsive to the power specifications defining parameters that cannot be satisfied by the inverter, operate the inverter to provide no power to the outlet panels.

A vehicle system includes a controller programmed to receive power specifications from interchangeable outlet panels via a communication channel and, responsive to replacing a first outlet panel with a second outlet panel, operate an inverter to change output power specifications of power provided by the inverter to the power specifications received from the second outlet panel.

The power specifications may include a target voltage and a target frequency, and the controller may be programmed to operate the inverter to supply power to the interchangeable outlet panels at the target voltage and target frequency. The power specifications may include a request for multiple voltage inputs to be supplied by the inverter, and the controller may be further programmed to operate the inverter such that separate phases of the inverter are used to supply each of the multiple voltage inputs. The multiple voltage inputs may be of different magnitudes. The power specifications may include a target DC magnitude and the controller may be programmed to operate the inverter to supply power with the target DC magnitude. The power specifications may include a current limit and the controller may be further programmed to operate the inverter such that a current provided by the inverter does not exceed the current limit. The controller may be further programmed to, responsive to the power specifications defining parameters that cannot be satisfied by the inverter, output a status via the communication channel for display on the interchangeable outlet panels.

A method includes, by a controller, receiving power specifications defining target voltages and corresponding target frequencies from outlet panels interchangeably coupled to a housing in communication with an inverter. The method further includes, responsive to a first outlet panel being replaced by a second outlet panel having different power specifications, changing, by the controller, a power output of the inverter to the target voltages and corresponding target frequencies received from the second outlet panel.

The method may further include, responsive to the power specifications defining parameters that cannot be satisfied by the inverter, outputting, by the controller, a status signal indicative of the inverter being unable to satisfy the power specifications. The method may further include, responsive to the power specifications defining parameters that can be satisfied by the inverter, outputting, by the controller, a signal to reset at least one circuit breaker in the outlet panels. The method may further include, responsive to receiving a status indicator indicative of a ground fault from the outlet panels, operating, by the controller, the inverter to cease outputting power to the outlet panels.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
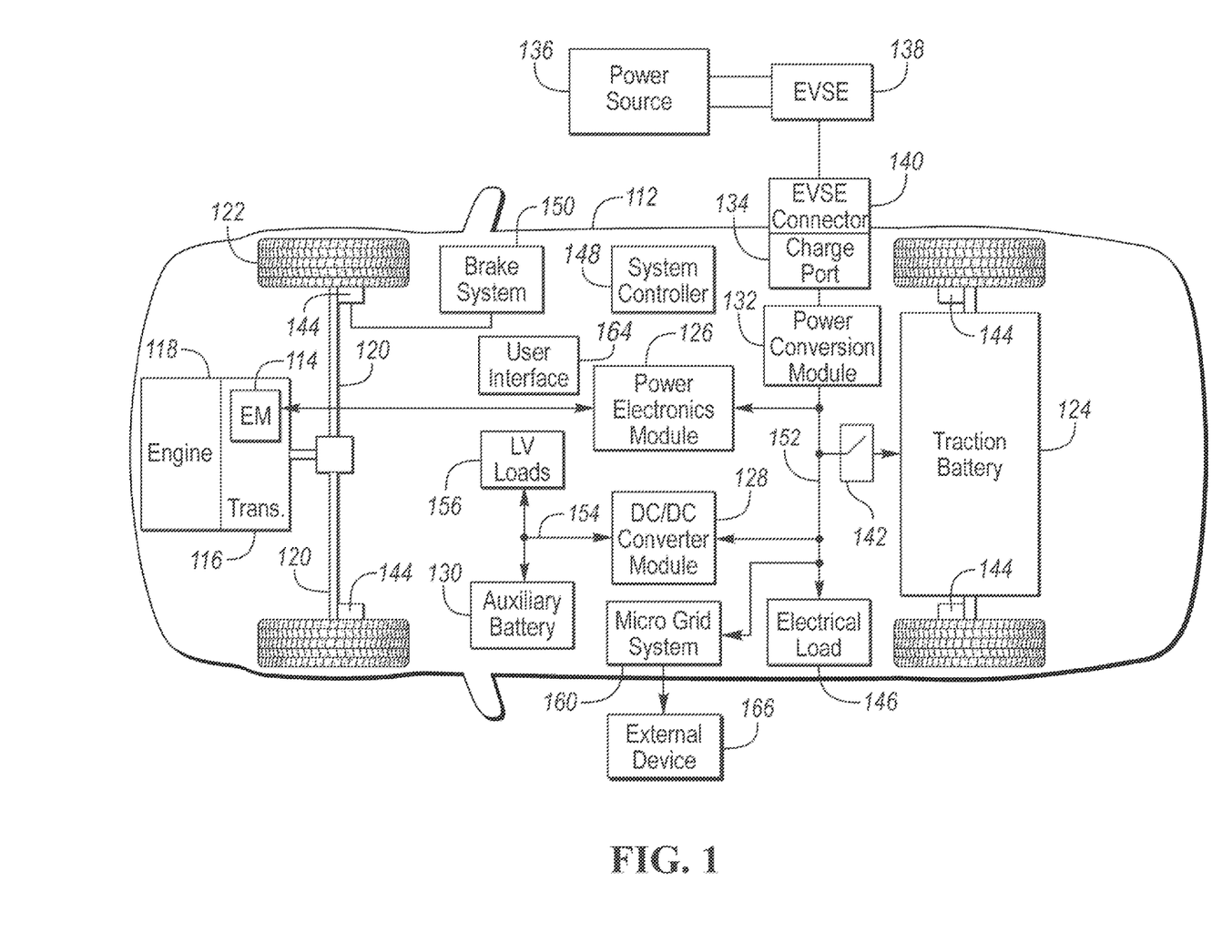
FIG. 1 depicts a possible configuration for an electrified vehicle.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a gearbox or hybrid transmission 116. The electric machines 114 may be capable of operating as a motor and a generator. In addition, the hybrid transmission 116 is mechanically coupled to an engine 118. The hybrid transmission 116 may be mechanically coupled to a differential 162 that is configured to adjust the speed of drive shafts 120 that are mechanically coupled to drive wheels 122 of the vehicle 112. The drive shafts 120 may be referred to as the drive axle. In some configurations, a clutch may be disposed between the hybrid transmission 116 and the differential 162. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A battery pack or traction battery 124 stores energy that can be used by the electric machines 114. The traction battery 124 may provide a high voltage direct current (DC) output. A contactor module 142 may include one or more contactors configured to isolate the traction battery 124 from a high-voltage bus 152 when opened and connect the traction battery 124 to the high-voltage bus 152 when closed. The high-voltage bus 152 may include power and return conductors for carrying current over the high-voltage bus 152. The contactor module 142 may be integrated with the traction battery 124. One or more power electronics modules 126 may be electrically coupled to the high-voltage bus 152. The power electronics modules 126 are also electrically coupled to the electric machines 114 and provide the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

In addition to providing energy for propulsion, the traction battery 124 may provide energy for other vehicle electrical systems. The vehicle 112 may include a DC/DC converter module 128 that converts the high voltage DC output from the high-voltage bus 152 to a low-voltage DC level of a low-voltage bus 154 that is compatible with low-voltage loads 156. An output of the DC/DC converter module 128 may be electrically coupled to an auxiliary battery 130 (e.g., 12V battery) for charging the auxiliary battery 130. The low-voltage loads 156 may be electrically coupled to the auxiliary battery 130 via the low-voltage bus 154. One or more high-voltage electrical loads 146 may be coupled to the high-voltage bus 152. The high-voltage electrical loads 146 may have an associated controller that operates and controls the high-voltage electrical loads 146 when appropriate. Examples of high-voltage electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charge station or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for coupling to a charge port 134 of the vehicle 112. The charge port 134 may be any type of port configured to transfer power from the EVSE 138 to the vehicle 112. The charge port 134 may be electrically coupled to an on-board power conversion module or charger 132. The charger 132 may condition the power supplied from the EVSE 138 to provide the proper voltage and current levels to the traction battery 124 and the high-voltage bus 152. The charger 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

The electrified vehicle 112 may include one or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components. Note that operations and procedures that are described herein may be implemented in one or more controllers. Implementation of features that may be described as being implemented by a particular controller is not necessarily limited to implementation by that particular controller. Functions may be distributed among multiple controllers communicating via the vehicle network.

The vehicle 112 may include a user interface 164 for interfacing with the operator. The user interface 164 may include display elements, such as lamps or a liquid-crystal display (LCD) module. The display elements may include a touch screen. The user interface 164 may further include input devices, such as switches, buttons, or touch-screen inputs.

The vehicle 112 may be configured to provide electrical power for external devices. The vehicle 112 may further include a microgrid system 160. The microgrid system 160 may be a vehicle system that is configured to provide electrical power to one or more external devices 166. The microgrid system 160 may receive power from the high-voltage bus 152 and the traction battery 124. The microgrid system 160 may include power conversion circuitry to generate an output voltage and current for external devices that are connected to the microgrid system 160.

Figure 2:
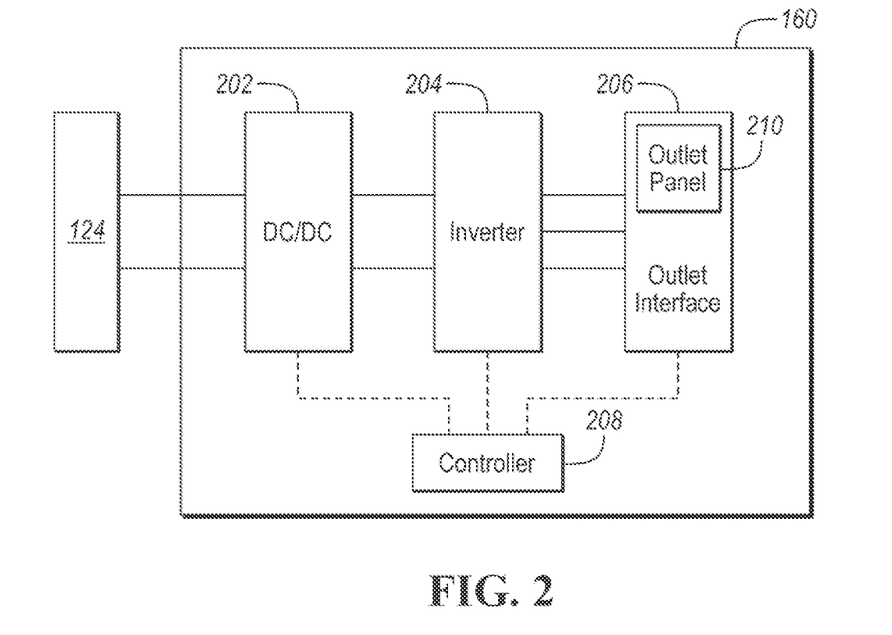
FIG. 2. depicts a possible configuration for a vehicle system for interfacing with an interchangeable outlet panel.

FIG. 2 depicts a possible diagram for the microgrid system 160. The microgrid system 160 may include a DC/DC power converter 202 that provides power to an inverter 204. In some configurations, the function of the DC/DC power converter 202 may be provided by the DC/DC converter module 128 that powers the low-voltage bus 154. The inverter 204 may be configured to convert a DC voltage input to an alternating current (AC) voltage output. The DC/DC power converter 202 may be configured to adjust the voltage level of the traction battery 124 to a voltage level used by the inverter 204. The inverter 204 may be configured to provide one or more voltage outputs. For example, the inverter 204 may be configured to provide three voltage outputs (e.g., three-phase inverter). In some configurations, the microgrid system 160 may be configured to utilize existing DC/DC converters and inverters that are in the vehicle (e.g., DC/DC converter module 128 and Power Electronics Module 126). The microgrid system 160 may include a controller 208. The controller 208 may be configured to operate the components of the microgrid system 160 including the DC/DC converter 202 and the inverter 204. The controller 208 may be integrated with the inverter 204. In some configurations, the controller 208 may be implemented as multiple controllers distributed or integrated with the other components.

The DC/DC power converter 202 may include inputs that are electrically coupled to the high-voltage bus 152 and the traction battery 124. The DC/DC power converter 202 may be configured to convert the voltage level of the high-voltage bus 152 to a desired voltage input level for the inverter 204. The DC/DC power converter 202 may include a bypass mode in which the voltage of the high-voltage bus is transferred to the inputs of the inverter 204. The DC/DC power converter 202 may include switching devices and circuit elements that are arranged and controlled to output the desired voltage level. The switching devices may be controlled by a controller (e.g., controller 208) that sequences the switching according to the desired power output. The DC/DC power converter 202 may include boost modes of operation that output a voltage that is greater than the voltage of the high-voltage bus 152. The DC/DC power converter 202 may include buck modes of operation that output a voltage that is less than the voltage of the high-voltage bus 152.

The inverter 204 may be configured to provide one or more voltage/current outputs. The inverter 204 may be configured to convert a DC voltage input into one or more AC voltage outputs. The inverter 204 may be a three-phase inverter that is configured to provide three AC voltage/current waveforms. The inverter 204 may include power switching circuitry that includes a plurality of switching devices. The switching devices may be Insulated Gate Bipolar Junction Transistors (IGBTs) or other solid-state switching devices. The switching devices may be arranged to selectively couple a positive terminal and a negative terminal of the high-voltage bus 152 to each terminal or leg of the inverter power output. Each of the switching devices within the power switching circuitry may have an associated diode connected in parallel to provide a path for inductive current when the switching device is in a non-conducting state. Each of the switching devices may have a control terminal for controlling operation of the associated switching device. The control terminals may be electrically coupled to a controller. The controller may include associated circuitry to drive and monitor the control terminals. For example, the control terminals may be coupled to the gate input of the solid-state switching devices.

Each leg of the inverter 204 may include a first switching device that selectively couples the HV-bus positive terminal to the associated output terminal. A first diode may be coupled in parallel to the first switching device. A second switching device may selectively couple the HV-bus negative terminal to the associated output terminal. A second diode may be coupled in parallel to the second switching device. Each inverter output leg may be similarly configured. To provide a DC voltage output, the first switching device may be activated continuously.

The controller (e.g., 208) may be programmed to operate the switching devices to control the voltage and current at the inverter outputs. The controller 208 may operate the switching devices so that each inverter output is coupled to only one of the HV-bus positive terminal or the HV-bus negative terminal at a particular time. Various power output algorithms and strategies are available to be implemented in the controller 208. The controller 208 may receive power specification data that identifies the desired voltage and current output waveform. For example, the inverter outputs may be characterized by voltage magnitude, current magnitude, and frequency. The controller 208 may be programmed to operate the inverter 204 to achieve the desired voltage and current output waveform. The controller 208 may implement open-loop and/or closed loop strategies to achieve the result. The controller 208 may operate the switching devices with a pulse-width modulated (PWM) gate signal.

The inverter 204 may include current sensors for each inverter power output. The current sensors may be inductive or Hall-effect devices configured to generate a signal indicative of the current passing through the associated circuit. The controller 208 may sample the current sensors at a predetermined sampling rate.

The inverter 204 may include one or more voltage sensors. The voltage sensors may be configured to measure an input voltage to the inverter 204 and/or one or more of the output voltages of the inverter 204. The voltage sensors may be resistive networks and include isolation elements to separate high-voltage levels from the low-voltage system. In addition, the inverter 204 may include associated circuitry for scaling and filtering the signals from the current sensors and the voltage sensors.

In some configurations, the DC/DC power converter 202 and inverter 204 may be integrated as a single unit. The overall function may remain as described. The end result is that the microgrid system 160 is configured to provide one or more power outputs. The microgrid system 160 may provide power outputs of varying power specifications. The power specifications may include voltage magnitude, current magnitude, and frequency. The controller 208 may be configured to operate the DC/DC power converter 202 and/or the inverter 204 to achieve power outputs with the requested power specifications. The microgrid system 160 may support a variety of different power specifications for different outlet panels 210. The microgrid system 160 may be configured to provide power having a range of desired frequencies and desired AC/DC voltage magnitudes. In addition, the microgrid system 160 may be configured to support simultaneous output of power signals having different power specifications (e.g., support multiple voltages with different magnitudes).

The microgrid system 160 may include an outlet interface 206. The outlet interface 206 may provide a mechanical and electrical interface to an outlet panel 210. The outlet interface 206 may include a housing that is configured to receive the outlet panel 210. The housing may be configured to interchangeably couple the outlet panel 210 to the inverter 204. The housing may include mechanical connection points for securing the outlet panel 210 to the housing. The outlet panel 210 may be secured by one or more fasteners and/or latching mechanisms. In some configurations, the housing may define an opening for inserting the outlet panel 210. A shape of the opening and the outlet panel 210 may be such that outlet panel 210 only fits into the opening in one orientation. Such configuration may prevent improper installation of the outlet panel 210 into the outlet interface 206. In other configurations, the opening and the outlet panel 210 may be keyed or slotted complementarily such that only proper installation is possible.

The outlet interface 206 may be further configured to receive the power outputs from the inverter 204. The outlet interface 206 may be further configured to transfer the power outputs from the inverter 204 to the outlet panel 210. For example, the outlet interface 206 may include a circuit board within the housing having conductive traces for routing signals and power. The outlet interface 206 may include a connector or receptacle for receiving a mating connector of the outlet panel 210. The conductors of the connectors may be electrically coupled to the traces to facilitate the transfer of power and data signals to and from the outlet panel 210. The connector or receptacle may define the interface between the vehicle electrical system and the outlet panel 210.

Industrial and household systems generally use commonly available power connections. For example, household applications typically utilize 120 VAC electrical power. Other household applications may use 240 VAC electrical power. Industrial applications may utilize 240V three-phase AC electrical power. The outlet panel 210 may be designed to support a variety of power connections. Standards may be defined to identify particular plugs and connectors for each type of electrical power connection. The outlet panel 210 may be configured with a variety of outlets that provide power with different characterizing parameters.

The outlet panel 210 may be designed as an interchangeable component. That is, outlet panels having different power connections may be swapped in and out of the outlet interface 206. To facilitate panel interchangeability, there may be some form of communication between the outlet panel 210 and the controller 208. Each outlet panel 210 may provide power outlets having a predetermined power specification. The outlet panels 210 may be configured to transfer information that is indicative of the power specification to the controller 208. The controller 208 may then operate the vehicle components to achieve the power specifications.

The controller 208 may implement general control strategies that support power specifications within a particular range of values. The controller 208 may operate the DC/DC converter 202 and the inverter 204 to achieve the power specifications. In some configurations, the controller 208 may be programmed to implement a predetermined set of power specifications. For example, the controller 208 may be programmed to implement typical household voltages and currents (e.g., 120 VAC, 240 VAC, 60 Hz).

Figure 3:
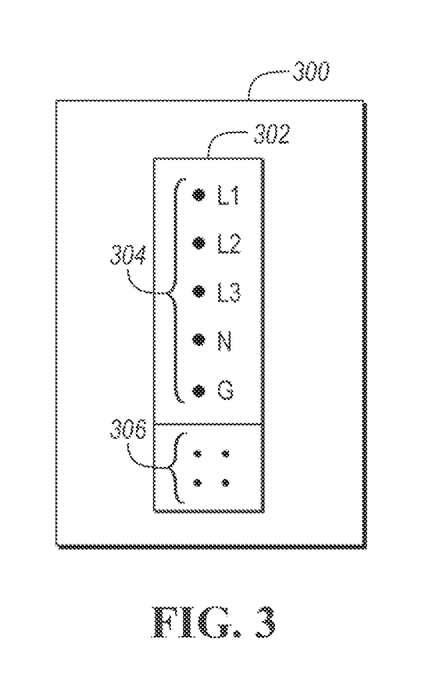
FIG. 3 depicts a diagram of possible electrical connection interface to the interchangeable outlet panel.

FIG. 3 depicts a possible connector-side view of an outlet panel 300 with an electrical connection interface 302. The electrical connection interface 302 may interface with the outlet interface 206 to electrically connect conductors between the outlet panel 300 and the outlet interface 206. For example, the connection interface 302 may be physically located on a back surface of the outlet panel 300. The connection interface 302 may include one or more power connections 304. The power connections may be routed to the outlets of the outlet panel 300. In this example, L1, L2, and L3 may represent power signals, N may represent a neutral connection, and G may represent a ground connection. The power connections 304 may be pins or recesses that interface with a mating connector of the outlet interface 206. The power connections 304 may be referred to as power transfer terminals.

The electrical connection interface 302 may include one or more signal or data connections 306. The data connections 306 may be referred to as communication terminals. For example, the signal connections 306 may include conductors for a serial data interface between the outlet panel 300 and the controller 208. The signal connections 306 may be pins or recesses that interface with a mating connector of the outlet interface 206. In some configurations, the signal connections 306 may be part of a separate connector from the power connections 304. The signal connections 306 may include power connections for electronic devices that are part of the outlet panel 300. For example, in some configurations, the signal connections 306 may include one or more connections to the low-voltage bus of the vehicle (e.g., 12V). In other configurations, power for electronic devices of the outlet panel 300 may be derived from the power connections 304 and power conversion circuitry may be included in the outlet panel 300. In some configurations, the communication interface may be an extension of the vehicle network (e.g., CAN). In some configurations, the communication interface may be a dedicated communication channel between the controller 208 and the outlet interface 206.

Figure 4:
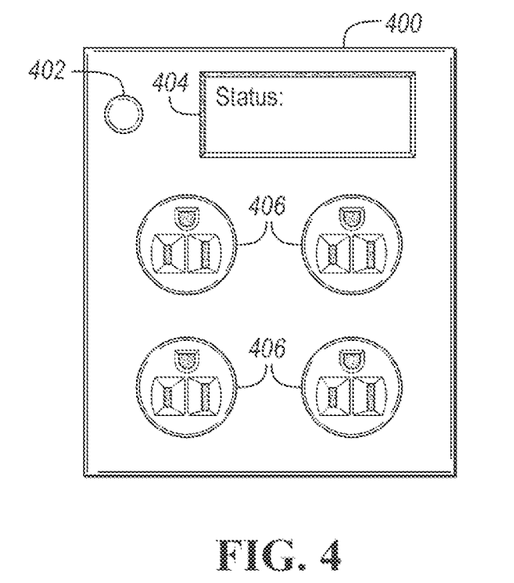
FIG. 4 depicts a first possible power outlet configuration for the interchangeable outlet panel.

Each outlet panel may be designed to provide a specific power interface for powering external equipment. As such, each outlet panel may be designed to supply a particular voltage and current to the external equipment. The outlet panels may include plugs or outlets for commonly available connection interfaces. FIG. 4 depicts a first example that may be a 120 VAC outlet panel 400 that is configured to provide power outlets that are configured to provide 120 VAC power to the external equipment. Power may be delivered to external equipment via one or more power outlets 406. The power outlets 406 may be mounted on a surface of the outlet panel 400. For example, the power outlets 406 may be mounted on a surface parallel to the connection interface 302 (e.g., front or top surface). The power outlets 406 may be standard outlets defined by commercial or household standards. In this example, the outlet panel 400 is configured to provide four 120 VAC power outlets 406. Note that the power outlets 406 may be configured with ports that accept a particular mating connector.

The outlet panel 400 may include one or more status indicators 402. The status indicators 402 may be lamps or light-emitting diodes (LEDs) that are configured to provide a visual indication of the status of the outlet panel 400. In some configurations, the status indicators 402 may provide different color light to indicate different status conditions. For example, a green light may indicate that the outlet panel 400 is plugged into the outlet interface 206 and power is available. A red light may indicate that the outlet panel 400 is plugged into the outlet interface 206 and power is not available.

The outlet panel 400 may include a display unit 404. The display unit 404 may be a liquid-crystal display (LCD) that is configured to display text and graphics. The display unit 404 may be configured to provide more detailed status information. For example, the status may display messages indicative of the availability of power to the power outlets 406. In some configurations, the status may display information regarding the power being provided. For example, voltage and current levels may be displays. The presence of abnormal conditions may also be displayed.

The outlet panel 400 may include control circuitry that may include a microprocessor system to operate the components of the outlet panel 400. For example, the control circuitry may be configured to operate the status indicators 402 and the display unit 404. In some configurations, the outlet panel 400 may include inputs switches and/or buttons that are configured to provide a user interface for some features.

Power connections from the inverter 204 (via the outlet interface 206) may be provided to the conductors of the power outlets 406. The outlet panel 400 may route a single power connection to each of the power outlets 406. In some configurations, the outlet panel 400 may route a different power connection to each of the power outlets 406. The outlet panel 400 may be configured to define the routing of the power signals (e.g., L1, L2, L3, N, G) to each of the power outlets 406. The particular routing that is defined may be different for each type of outlet panel. By distributing the power between the power signals, the power may be balanced to ensure that power limits of the inverter 204 are not exceeded.

Figure 5:
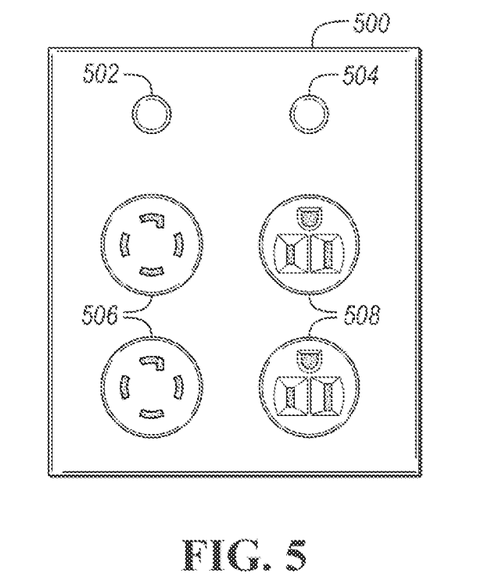
FIG. 5 depicts a second possible power outlet configuration for the interchangeable outlet panel.

FIG. 5 depicts another possible outlet panel 500. The outlet panel 500 may be configured with a first set of power outlets 506 and a second set of power outlets 508. The first set of power outlets 506 may be 240 VAC power outlets. The second set of power outlets 508 may be 120 VAC power outlets. The outlet panel 500 may include a first indicator 502 and a second indicator 504. The first indicator 502 may be configured to convey status of the first set of power outlets 506. The second indicator 504 may be configured to convey status of the second set of power outlets 508.

In this example, power signals L1 and L2 may be defined to provide power to the first set of power outlets 506. Power signal L3 may be defined to provide power to the second set of power outlets 508. The routing and power specifications for the outlets may define the manner in which the inverter 204 is to be operated.

The microgrid system may be configured so that outlet panels may be swapped or changed when a different power configuration is desired. Outlet panels with different combinations of power outlets may be defined (e.g., FIG. 4, FIG. 5). This feature provides flexibility in the microgrid system as many outlet panels may be designed with different power specifications. Many additional combinations of power outlets may be defined. The outlet panels may be configured to be removable from the outlet interface 206. In some configurations, the outlet panels may be secured to the outlet interface 206 via a fastener (e.g., thumb screw). The operator may swap outlet panels to match the equipment that is to be powered from the microgrid system.

As discussed, a variety of outlet panels may be installed in the outlet interface 206. To ensure that the inverter 204 outputs the correct voltage levels, the system may benefit from knowing which type of outlet panels are connected. In a configuration in which the inverter provides a fixed output voltage, the outlet panels may be keyed such that only outlet panels that are compatible may be installed. Each outlet panel may be configured to provide a connection to the electrical connection interface 302. Each outlet panel may be configured to utilize the power and data signals from the electrical connection interface 302 as needed. However, the outlet panel may be configured to ensure that any limits defined by the electrical connection interface 302 are not exceeded. For example, the outlet panel should be designed to not exceed power and current limits for each signal in the electrical connection interface 302.

Figure 6:
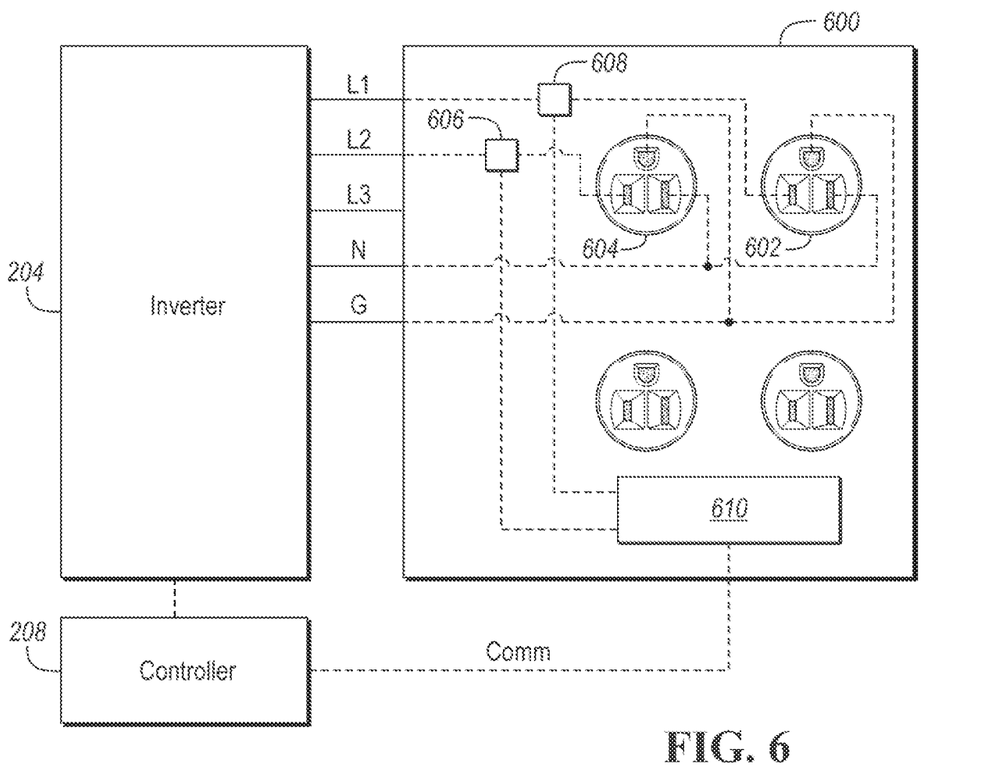
FIG. 6 depicts a diagram depicting electrical connections between components of the vehicle system.

FIG. 6 depicts a possible electrical connection diagram for the microgrid system. An outlet panel 600 may be installed in the outlet interface such that electric connections between the outlet panel 600 and the inverter 204 and controller 208 are established. Inverter outputs may be labeled as L1, L2, L3, N, and G and may function as described previously. In this example, the neutral connection (N) may be connected to neutral connections of a first outlet port 602 and a second outlet port 604. The ground connection from the inverter 204 may be coupled to ground connections of the first outlet port 602 and the second outlet port 604. The L1 connection of the inverter 204 may be coupled to a power connection of the first outlet port 602 through a first circuit breaker 608. The L2 connection of the inverter 204 may be coupled to a power connection of the second outlet port 604 through a second circuit breaker 606. The circuit breakers 606, 608 may be configured to open the circuit when current passing through exceeds a threshold (e.g., 15 Amps). The circuit breakers 606, 608 may resettable via a control signal. That is, circuit breakers 606, 608 may be configured to close when the control signal attains a reset state. In addition, the circuit breakers 606, 608 may be configured to provide a status signal that is indicative of the open/close state of the circuit breaker.

The outlet panel 600 may include an outlet panel controller 610. The circuit breakers 606, 608 may be electrically resettable by the outlet panel controller 610 via a control signal that is electrically connected to the outlet panel controller 610. The outlet panel controller 610 may include interface circuitry for activating and deactivating the control signal. The outlet panel controller 610 may be electrically connected to the controller 208 via the signal and data connections of the electrical interface. The outlet panel controller 610 may be programmed to transfer and receive data via the electrical interface. For example, the outlet panel controller 610 may implement a serial data interface for communicating with the controller 208. A communication protocol may be established for transferring data between the outlet panel controller 610 and the controller 208.

The data transferred from the outlet panel controller 610 may include power outlet data that includes power specifications for the outlet panel. The power specifications may include target voltage magnitudes and frequencies. The power specifications may include a current limit. The current limit may be a value that corresponds to a rated current of the circuit breakers 606, 608. In addition, the power specifications may include a power type. For example, the power type may be DC or AC. The outlet panel controller 610 may transfer the power outlet data to the controller 208 when the outlet panel 600 is installed in the outlet interface 206. The specifications may further include information for each of the power connections (e.g., L1, L2, L3). Each power connection may be associated with a voltage, frequency and phase information. For example, in some configurations, a phase difference may be defined between two of the power connections. The power outlet data may define the power connections and the desired phase difference. The power outlet data may further include an indication of which power connections are used and which are not used for the outlet panel.

Additional data may be transferred via the communication interface. The outlet panel controller 610 may be programmed to receive a circuit breaker reset signal from the controller 208. The reset signal may trigger the outlet panel controller 610 to drive the control signal to the circuit breakers 606, 608 to close the breakers and connect the power signals to the outlet ports 602, 604. The outlet panel controller 610 may also transfer a status of the circuit breaker (e.g., open or closed) to the controller 208.

The outlet panel 600 or the inverter 204 may include a ground fault interrupter circuit. The ground fault interrupter circuit may be configured to compare the current flowing to the power pins and from the neutral pin and open the circuit if the currents differ by more than a predetermined amount. The ground fault interrupter circuit may work in conjunction with the circuit breakers 606, 608. In some configurations, the circuit breaker and ground fault interrupter circuit may be combined. The ground fault interrupter circuit may also be implemented in the inverter 204. After opening the circuit, the ground fault interrupter circuit may be reset via a control signal.

The outlet panel controller 610 may be configured to drive the control signal for the ground fault interrupter circuit. The outlet panel controller 610 may transfer a status of the ground fault interrupter circuit (e.g., triggered, not triggered) to the controller 208. In configurations in which the ground fault interrupter circuit is implemented in the inverter 204, the controller 208 may transfer the status to the outlet panel controller 610.

The outlet panels may be configured to support a variety of power connections and ports. An advantage of the system is that outlet panels may be designed to support common electrical connections in a variety of countries. The outlet panels communicate the desired power requirements to the vehicle which can operate the inverter in the proper way. Since the outlet panels may be interchangeable, the microgrid system may be configured to provide a variety of power signals to the outlet panels. In this manner, the outlet panels are plug-and-play with the vehicle.

Operation of the microgrid system 160 may be maintained during ignition-off periods. During this time, power may be provided by the traction battery 124. In addition, operation of the microgrid system 160 may be maintained during ignition-on periods. During ignition-on periods, power may be provided by the traction battery 124. In electrified vehicles that include an engine, power may be further provide by the electric machines 114 which may be operated as generators powered by the engine 118. This allows the microgrid system 160 to operate for potentially long periods of time. The microgrid system 160 may find use in vehicles for construction operations that may need a variety of power outlets at remote sites where power may not be available.

The controller 208 may be programmed to operate the inverter 204 according to the power specifications received from the outlet panel controller 610. The controller 208 may command operation of the DC/DC converter 202 and the inverter 204 to achieve the power outputs with the specified power configuration. For example, the controller 208 may operate the inverter 204 to output an AC voltage with a magnitude and frequency that matches the power specification provided by the outlet panel. In addition, the controller 208 may operate the inverter 204 such that the power outputs of the inverter 204 have a desired phase difference as defined by the power outlet data. The controller 208 may command the DC/DC converter 202 to provide a DC voltage to the inverter 204 that allows the inverter 204 to provide the voltage magnitude as specified in the power specification provided by the outlet panel. The controller 208 may operate the inverter 204 using voltage and current feedback to ensure that the power specification is being satisfied.

In some configurations, the outlet panel controller 610 may be a circuit that provides signals to the controller 208. The power outlet data may be encoded with discrete signals that are decoded by the controller 208. For example, the power outlet data may be encoded in four data pins in which fifteen different configurations may be identified. Note that additional data pins may be included to expand the configurations. Further, the data interface may include discrete signals for status and reset of the circuit breakers and the ground fault interrupter circuit.

The controller 208 may be programmed to manage the system when outlet panels are swapped and/or replaced with a different type of outlet panel. The controller 208 may be programmed to, responsive to replacing a first outlet panel with a second outlet panel having different power specifications, change the power specifications of power being output by the inverter 204 to the power specifications received from the second outlet panel. The controller 208 may further detect the removal of the first outlet panel and operate the inverter 204 to provide no power after removal of the first outlet panel, prior to insertion of the second outlet panel.

Some of the outlet panels may be configured to receive multiple power inputs and the corresponding power specifications may define target voltages and target frequencies for multiple power inputs. The controller 208 may be programmed to operate the inverter 204 such that separate output of the inverter 204 are used to supply the multiple power inputs with the corresponding target values and target frequencies. The target voltage and/or target frequencies may be different for each of the multiple power inputs.

Figure 7:
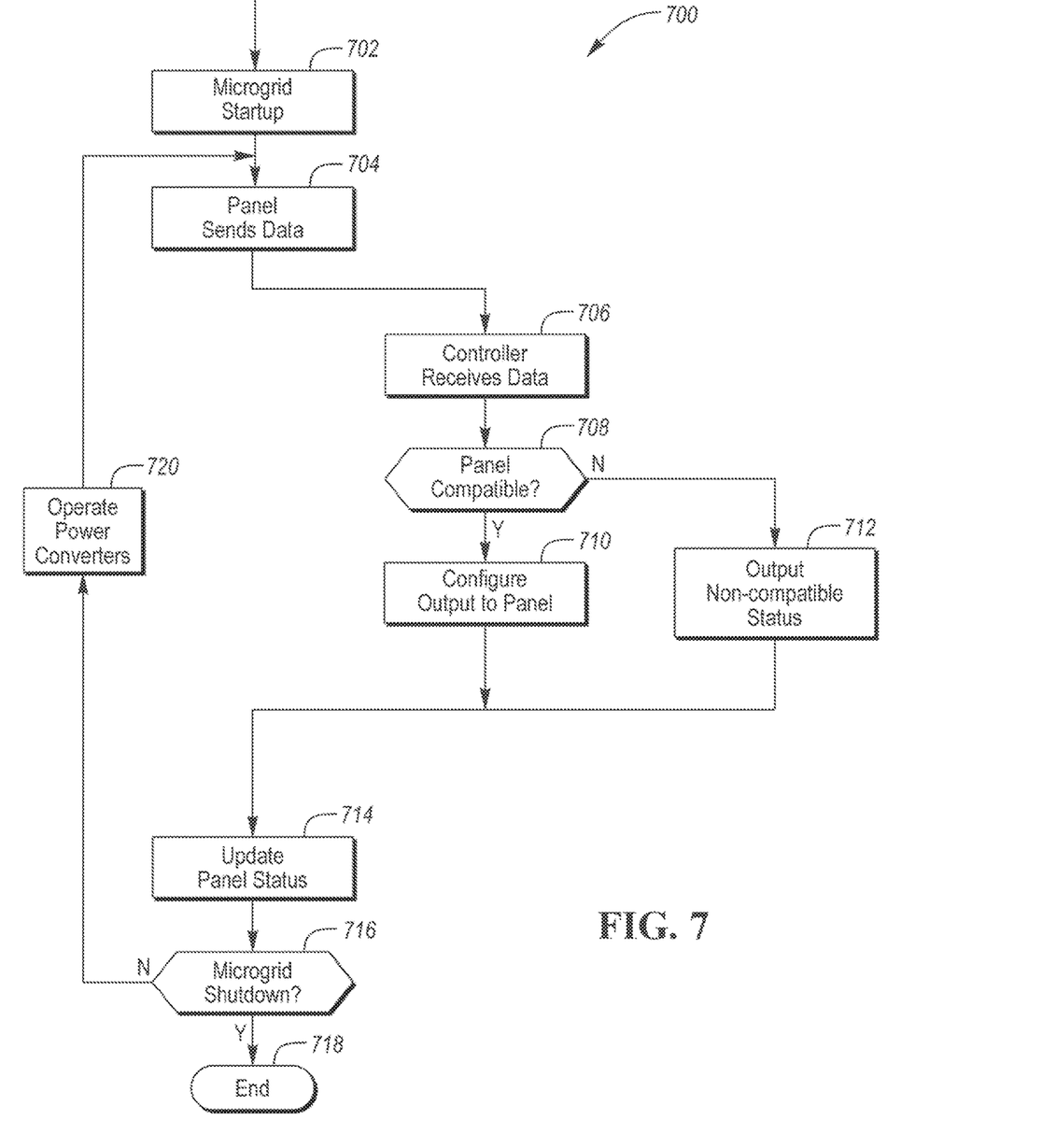
FIG. 7 is a flowchart of a possible sequence of operations for interfacing between the interchangeable outlet panel and the vehicle.

FIG. 7 is a flowchart 700 for a possible sequence of operations for managing the microgrid system. At operation 702, instructions for starting up the microgrid may be performed. The microgrid startup may include initialization of the components upon power up or insertion of the outlet panel into the outlet interface. Microgrid startup may include establishing communication between the installed outlet panel and the controller 208. At operation 704, the outlet panel may transfer power outlet data to the controller 208. The power outlet data may indicate the power configuration that is to be provided to the outlet panel.

At operation 706, the controller 208 may receive and process the power outlet data. The power outlet data may include power specifications including target voltage and target frequencies. At operation 708, the controller 208 may check to determine if the power outlet data is compatible with the microgrid system. For example, the controller 208 may determine if the inverter 204 is capable of providing power with the requested power specifications. The controller 208 may also determine if the DC/DC converter 202 is capable of providing an appropriate input level to the inverter 204. If the request is not compatible with the inverter capability, operation 712 may be performed. At operation 712, the controller 208 may output a status indicating the incompatibility. For example, the status may be sent to the outlet panel for display (e.g., lamp or display). The status may also be sent to the user interface of the vehicle for display within the vehicle.

If the request is compatible with the inverter capability, operation 710 may be performed. At operation 710, the controller 208 may configure the power output to the outlet panel to satisfy the power specification. The controller 208 may configure operating parameters of the inverter 204 and DC/DC converter 202 to provide the specified power outputs. At operation, 714, the outlet panel may update the panel status. For example, the outlet panel controller may receive the status from the controller 208 and may output the status. For example, if the microgrid system is operational, the outlet panel may illuminate a lamp or present status information on a display. In addition, the outlet panel may reset circuit breakers if present. At operation 716, a check is made to determine if the microgrid is to be shutdown. For example, the system may detect if the outlet panel is removed from the vehicle. In other examples, the outlet panel may include a switch (e.g., on/off switch) for enabling and disabling operation. If the microgrid system is to be shutdown, the inverter 204 may be commanded to cease outputting power. If a microgrid shutdown is not detected, operation 720 may be performed and the sequence may be repeated from operation 704. At operation 720, the controller 208 may operate the inverter 204 and/or DC/DC converter 202 to achieve a power outputs that satisfies the requested power specification.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   an inverter;
   a housing configured to interchangeably couple outlet panels, each defining power specifications including target voltages and target frequencies, to the inverter; and
   a controller programmed to,
      responsive to replacing a first outlet panel with a second outlet panel, change voltage and frequency outputs of the inverter to the target voltages and target frequencies received from the second outlet panel, and
      output a reset signal to the outlet panels for resetting a circuit breaker in the outlet panels configured with the circuit breaker.

2. The vehicle of claim 1 wherein the controller is further programmed to receive a status of a ground fault interrupter circuit from the outlet panels.

3. The vehicle of claim 1 wherein the outlet panels receive multiple power inputs and the power specification defines corresponding target voltages and target frequencies for each of the multiple power inputs, and the controller is further programmed to operate the inverter such that separate outputs of the inverter are used to supply the multiple power inputs with the corresponding target voltages and target frequencies.

4. The vehicle of claim 3 wherein at least two of the target voltages are of different magnitudes.

5. The vehicle of claim 1 wherein the power specification defines a target direct current (DC) voltage magnitude and the controller is programmed to operate the inverter to supply power with the target DC voltage magnitude.

6. The vehicle of claim 1 wherein the power specifications further define a current limit value and the controller is further programmed to operate the inverter such that a current provided by the inverter does not exceed the current limit value.

7. The vehicle of claim 1 wherein the controller is further programmed to, responsive to the power specifications defining parameters that cannot be satisfied by the inverter, output a status to the outlet panels for display.

8. The vehicle of claim 1 wherein the controller is further programmed to responsive to the power specifications defining parameters that cannot be satisfied by the inverter, operate the inverter to provide no power to the outlet panels.

9. A vehicle system comprising:
a controller programmed to receive power specifications from interchangeable outlet panels via a communication channel and, responsive to replacing a first outlet panel with a second outlet panel, operate an inverter to change output power specifications of power provided by the inverter to the power specifications received from the second outlet panel, wherein the power specifications include a request for multiple voltage inputs to be supplied by the inverter, and the controller is further programmed to operate the inverter such that separate phases of the inverter are used to supply each of the multiple voltage inputs.

10. The vehicle system of claim 9 wherein the power specifications include a target voltage and a target frequency, and the controller is programmed to operate the inverter to supply power to the interchangeable outlet panels at the target voltage and target frequency.

11. The vehicle system of claim 9 wherein the multiple voltage inputs are of different magnitudes.

12. The vehicle system of claim 9 wherein the power specifications include a target DC magnitude and the controller is programmed to operate the inverter to supply power with the target DC magnitude.

13. The vehicle system of claim 9 wherein the power specifications include a current limit and the controller is further programmed to operate the inverter such that a current provided by the inverter does not exceed the current limit.

14. The vehicle system of claim 9 wherein the controller is further programmed to, responsive to the power specifications defining parameters that cannot be satisfied by the inverter, output a status via the communication channel for display on the interchangeable outlet panels.

15. A method comprising:
by a controller, receiving power specifications defining target voltages and corresponding target frequencies from outlet panels interchangeably coupled to a housing in communication with an inverter;
responsive to a first outlet panel being replaced by a second outlet panel having different power specifications, changing, by the controller, a power output of the inverter to the target voltages and corresponding target frequencies received from the second outlet panel; and
responsive to receiving a status indicator indicative of a ground fault from the outlet panels, operating, by the controller, the inverter to cease outputting power to the outlet panels.

16. The method of claim 15 further comprising, responsive to the power specifications defining parameters that cannot be satisfied by the inverter, outputting, by the controller, a status signal indicative of the inverter being unable to satisfy the power specifications.

17. The method of claim 15 further comprising, responsive to the power specifications defining parameters that can be satisfied by the inverter, outputting, by the controller, a signal to reset at least one circuit breaker in the outlet panels.

* * * * *